United States Patent [19]
Van Der Zee

[11] Patent Number: 6,064,434
[45] Date of Patent: May 16, 2000

[54] BEAM CURRENT MEASUREMENT

[75] Inventor: Pieter Van Der Zee, Nijmegen, Netherlands

[73] Assignee: U.S. Philips Corporation, New York, N.Y.

[21] Appl. No.: 08/792,045

[22] Filed: Feb. 3, 1997

[30] Foreign Application Priority Data

Feb. 7, 1996 [EP] European Pat. Off. ............... 96200267

[51] Int. Cl.[7] ....................................................... H04N 5/68
[52] U.S. Cl. ........................ 348/380; 348/805; 327/108; 330/265
[58] Field of Search ..................................... 348/380, 381, 348/382, 377, 378, 379, 805, 657; 330/257, 265; 327/108, 317, 109, 111, 112; H04N 5/68

[56] References Cited

U.S. PATENT DOCUMENTS

| | | |
|---|---|---|
| 4,224,640 | 9/1980 | Hovens et al. ........................... 348/380 |
| 4,679,092 | 7/1987 | Blanken et al. . |
| 4,680,640 | 7/1987 | Blanken et al. . |
| 4,703,345 | 10/1987 | Matsuzaki et al. . |
| 5,406,139 | 4/1995 | Sharpe-Geisler ........................ 326/71 |

*Primary Examiner*—Michael H. Lee
*Attorney, Agent, or Firm*—Edward W. Goodman

[57] ABSTRACT

In a beam current measurement device, including an output transistor (T1) for supplying a cathode current (Ic), a measurement output (OUTM) for supplying a measured current (Im) representing the cathode current (Ic), a first current source (Ibias1) coupled to a first main terminal of the output transistor (T1) for supplying a first current (Ibias1), and a second current source (Ibias2) coupled to a second main terminal of the output transistor (T1) for supplying a second current (Ibias2) substantially equal to the first current (Ibias1), a first cascode transistor (Ta) is coupled between the first main terminal of the output transistor (T1) and the measurement output (OUTM).

5 Claims, 3 Drawing Sheets

BEAM CURRENT MEASUREMENT

BACKGROUND OF THE INVENTION

1. Field of the Invention

The invention relates to a beam current measurement device, and to a picture display apparatus comprising such a beam current measurement device.

2. Description of the Related Art

U.S. Pat. No. 4,680,640 (PHN 11,505) discloses a picture display device in which errors occurring in the beam current measurement in a video output stage are reduced by increasing the recharging rate of the capacitive load (constituted by the picture display tube) of a video amplifier with the aid of a bias current or quiescent current which is subtracted again from the current applied to an input of the beam current measuring circuit which is controlled by the video amplifier. More specifically, a cathode of the picture display tube is coupled to the emitter of an emitter-follower drivable by the video amplifier. A negative feedback input of the video amplifier is coupled to an input of the emitter-follower. The collector of the emitter-follower is coupled to an input of the beam current measuring circuit. An anti-blocking circuit is coupled to the cathode of the picture display tube to prevent blocking of the beam current measuring circuit due to leakage currents in the picture display tube. The anti-blocking circuit produces an emitter-follower current of the order of magnitude of at least approximately 100 $\mu$A. A current source is coupled to the input of the beam current measuring circuit for draining the emitter-follower current produced by the anti-blocking circuit. In one embodiment, the emitter-follower forms part of a complementary emitter-follower circuit having an additional emitter-follower which is complementary to the first-mentioned emitter-follower, the anti-blocking circuit generates a bias voltage for the basis of the emitter-followers, and the current source is a current mirror circuit an input of which is coupled to an output of a further current mirror circuit an input of which is coupled to the cathode of the additional emitter-follower.

In this embodiment, it appeared that if the actual transfer functions of the current mirrors deviate from their respective nominal transfer functions such that the actual transfer functions are $\alpha$ and $\beta$ times the respective nominal transfer functions, the part of the actual cathode current which flows through the current mirrors is affected by the ratio of these deviations $\alpha$ and $\beta$, and the measured cathode current is formed by the sum of the part of the actual cathode current which does not flow through the current mirrors and which is thus unaffected, the part of the actual cathode current which flows through the current mirrors and which is affected, and the bias current through the emitter-follower transistors multiplied by a factor depending on $\alpha$ and $\beta$. The bias current through the emitter-followers depends on the manner in which the output amplifier is controlled, and may vary to a large extend and even become zero. This means that in certain circumstances, the distortion in the measured cathode current which is caused by the deviations in the transfer functions may reach values of the order of magnitude of the actual beam current, so that the beam current measurement is seriously affected.

SUMMARY OF THE INVENTION

It is, inter alia, an object of the invention to provide an improved beam current measurement. To this end, a first aspect of the invention provides a device comprising an output stage for supplying a cathode current; a measurement output for supplying a measured current representing the cathode current; means for supplying a first current, the first current supplying means being coupled to a first main terminal of the output stage; means for supplying a second current substantially equal to said first current, the second current supplying means being coupled to a second main terminal of the output stage; and a first cascode transistor coupled between the first main terminal of the output stage and the measurement output. A second aspect of the invention provides a picture display apparatus comprising a picture display tube having a cathode to which a cathode current is applied; and a video signal output stage coupled to the cathode, the video output stage including a beam current measurement device for measuring the cathode current as noted above.

A beam current measurement device, according to a primary aspect of the invention, comprises an output transistor for supplying a cathode current, a measurement output for supplying a measured current representing the cathode current, a first current source coupled to a first main terminal of the output transistor for supplying a first current, and a second current source coupled to a second main terminal of the output transistor for supplying a second current substantially equal to the first current, in which a first cascode transistor is coupled between the first main terminal of the output transistor and the measurement output.

A primary embodiment of the invention provides a new manner of subtracting the quiescent current through the emitter-follower transistors from the total current through these emitter-follower transistors in order to obtain a measurement of the actual beam current. Instead of two current mirrors, two folded cascode circuits are used. As will be set out below, the measured beam current will then be the actual beam current plus an offset caused by the difference between the currents from the two current sources used with the folded cascodes. The advantage of this circuit is that these current sources provide constant currents which cause a constant offset independent from the quiescent currents in the emitter-follower. Further advantages of a preferred embodiment of the invention comprising the folded cascodes are:

The output range of the emitter-follower output stage is not limited.

The measuring circuit input is not directly connected to the emitter-follower, so that the voltage at the measuring circuit input does not influence the output range of the output stage.

The maximum current to the measuring circuit input is limited to the current from the current sources of the folded cascodes. Especially with fast amplifiers or power amplifiers, the currents in the output stage can reach very high values. In such a case, it is very desirable to have these currents flow locally instead of thru the long loop of the long loop of the measuring circuit as in the prior art.

Except for the offset current, the cathode current is applied to the measuring circuit input without distortion.

The invention renders it possible to measure small (dark) beam currents in the order of magnitude of 10 $\mu$A in a very accurate manner.

These and other aspects of the invention will be apparent from and elucidated with reference to the embodiments described hereinafter.

DESCRIPTION OF THE PREFERRED EMBODIMENTS

Figure 1:
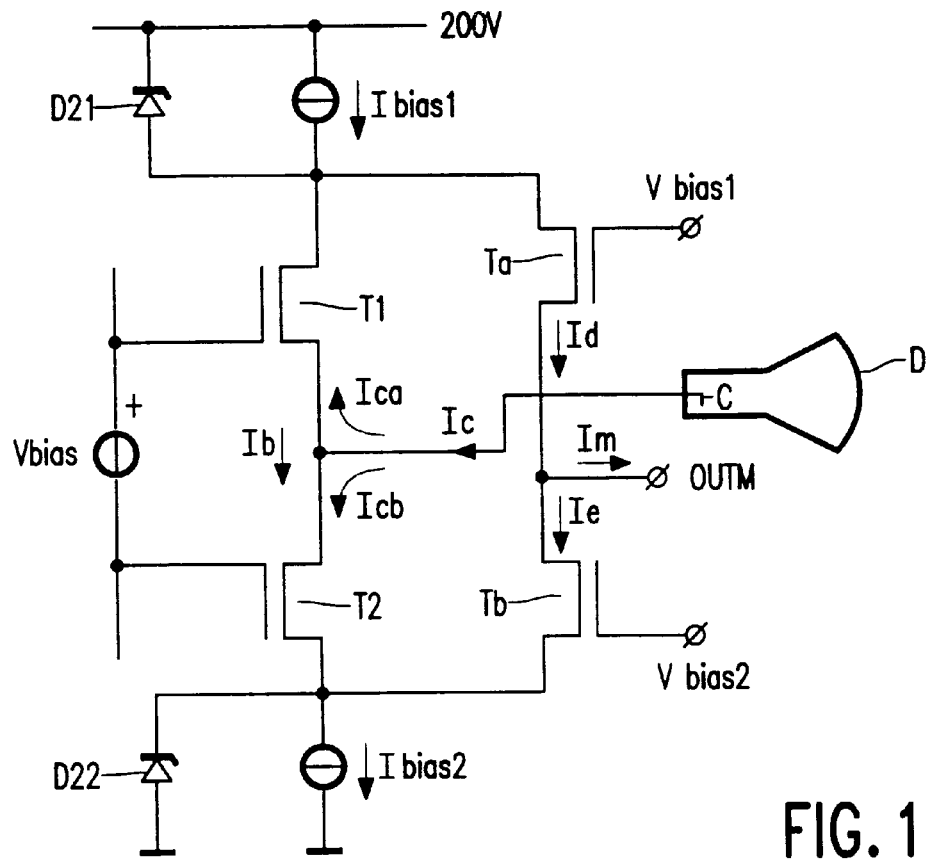
FIG. 1 shows a first embodiment of a picture display apparatus in accordance with the invention.

In the embodiment of FIG. 1, a bias voltage source Vbias is connected between the gates of first and second field-effect transistors T1, T2 which are connected in a complementary "emitter-follower" (source-follower) configuration. The bias voltage source Vbias may be formed with diodes as in FIG. 2 of U.S. Pat. No. 4,680,640 (PHN 11,505), with two bipolar transistors having their respective bases connected to their respective collectors, or with two MOSFETs having their respective gates connected to their respective drains. The sources of the transistors T1, T2 are connected to the cathode C of a display tube D. The drain of the transistor T1 is connected to a 200 V supply line through a bias current source Ibias1, and to a measuring output OUTM thru a transistor Ta. A bias voltage Vbias1 is applied to the gate of the transistor Ta. The drain of the transistor T2 is connected to ground through a bias current source Ibias2, and to the measuring output OUTM thru a transistor Tb. A bias voltage Vbias2 is applied to the gate of the transistor Tb. The measuring output OUTM is connected to a beam current measuring circuit (not shown). Zener diodes D21 and D22 are connected in parallel to the bias current sources Ibias1 and Ibias2, respectively, to handle large currents flowing through the source-follower transistors T1, T2 during normal operation. During the black current measurement to which the invention pertains, the currents through the source-follower transistors T1, T2 are smaller than the bias currents Ibias1 and Ibias2. For the remainder of the picture display apparatus, reference is made to FIG. 2 of U.S. Pat. No. 4,680,640 (PHN 11,505), herein incorporated by reference.

The cathode current Ic is split up into a current Ica through transistor T1 and a current Icb through transistor T2, which currents Ica, Icb are superposed on the bias current Ib through transistors T1, T2 caused by the bias voltage Vbias applied to their gates. In contrast to the prior art in which one of the parts Ica, Icb of the cathode current Ic is conveyed to the measuring output through two current mirrors, while the other part is directly conveyed to the measuring output, now both parts Ica, Icb of the cathode current Ic are conveyed to the measuring output OUTM through a folded cascode stage.

When the actual cathode current Ic is zero, current Id through transistor Ta equals Ibias1−Ib, current Ie through transistor Tb equals Ibias2−Ib, and current Im, supplied to the measuring output OUTM, equals Id−Ie which equals zero in the ideal situation in which Ibias1=Ibias2. In a less ideal situation, there is a small deviation between Ibias1 and Ibias2, such that Ibias1=$\alpha$.Ibias2, which results in that Im=($\alpha$−1).Ibias2. Consequently, even with non-ideally equal bias currents Ibias1, Ibias2, the measuring current Im does not depend on the bias current Ib through the emitter-follower transistors T1, T2.

When Ic is taken into account, Id=Ibias1−(Ib−Ica), Ie=Ibias2−(Ib+Icb), and Im=Id−Ie=Ica+Icb+Ibias1−Ibias2= Ic+($\alpha$−1).Ibias2. Consequently, the measured cathode current Im is formed by the actual cathode current Ic plus a substantially constant and small offset current.

The embodiment of FIG. 1 can be simplified by omitting the second cascode transistor Tb, so that the measuring output OUTM is directly coupled to the second bias current source Ibias2. While this modification is simpler and cheaper, the second bias current Ibias2 is less easily kept constant as the voltage over the second bias current source Ibias2 is no longer constant.

In another modification (not shown) of the embodiment of FIG. 1, both the source-follower transistor T2 and the second cascode transistor Tb are omitted, where the cathode C of the image display tube D and the source of the transistor T1 are directly coupled to the second bias current source Ibias2, while the drain of the cascode transistor Ta and the measuring output OUTM are coupled to a further bias current source. In this modification, it holds that Ibias1=Ibias2+a further bias current supplied by the further bias current source.

As a consequence of the non-zero output impedances of the current sources Ibias1, Ibias2, these bias currents depend to some extent on the bias current through the emitter-follower transistors. By actively keeping the source voltages of the cascode transistors Ta, Tb constant, so that the voltages over the current sources Ibias1, Ibias2 are kept constant, and by varying the gate voltages, it is possible to substantially completely suppress the dependence of the bias currents Ibias1, Ibias2 on the bias current Ib thru the emitter-follower transistors. It should be noted that Im is limited by Ibias1 and Ibias2, and that both Ibias1 and Ibias2 should exceed Ib.

Figure 2:
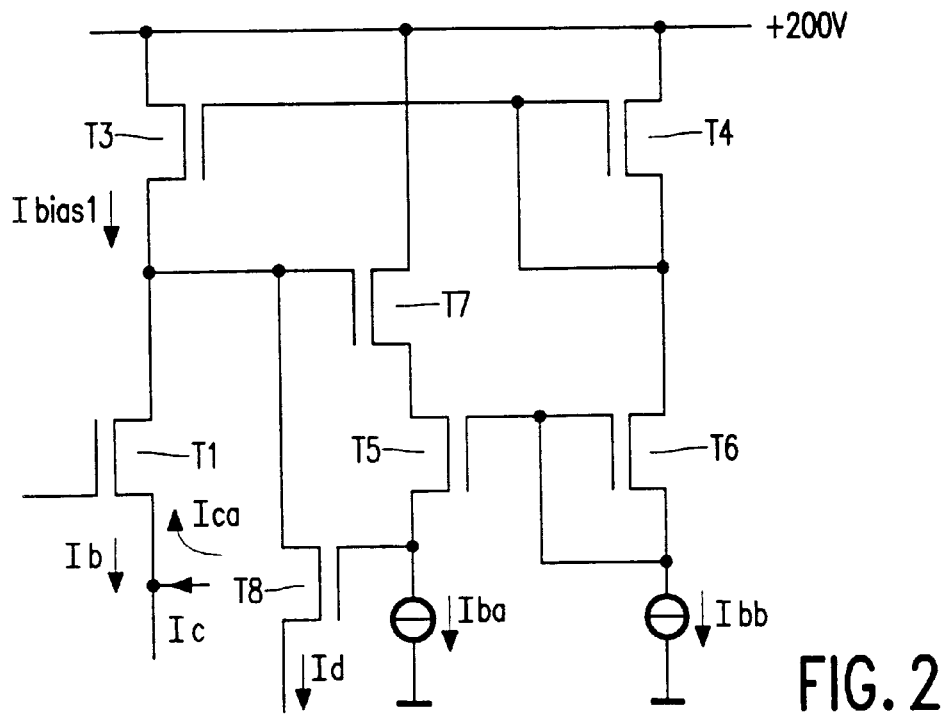
FIG. 2 shows part of a second embodiment of a beam current measuring device in accordance with the invention.

FIG. 2 shows part of a second embodiment of a beam current measuring device in accordance with the invention, in which this improvement is implemented. Only the upper part of the circuit is shown; the lower part is easily derived from the shown upper part. The bias current Ibias 1 is provided by an output of a current mirror T3, T4. A current source Iba is connected to a drain of a cascode transistor T5. A current source Ibb is connected to a drain of a transistor T6 coupled for supplying a bias current to transistor T5. The source of transistor T6 is connected to the input of the current mirror T3, T4. The source of transistor T5 is connected to the drain of a transistor T7 having a source which is connected to the 200 V supply line, and a gate which is connected to the output of the current mirror T3, T4. The drain of the transistor T5 is also connected to the gate of a transistor T8 having a source which is connected to the output of the current mirror T3, and a drain which supplies the current Id. So, transistor T8 in FIG. 2 corresponds to transistor Ta in FIG. 1.

Transistor T8 is the cascode transistor which is controlled by transistor T7 via transistor T5. Transistor T7 ensures that the voltage over transistor T3 remains constant, such that the gate-source voltage of transistor T7 causes a drain current Iba through transistor T7. Transistor T5 is a cascode transistor for transistor T7 so that the voltage over transistor T7 remains constant even if the current Ib varies, and consequently, the control voltage of the transistor T8 also varies (as a current through a transistor can only vary if the control voltage of the transistor varies). W(Tx) is herewith defined to indicate the width of the channel of the MOS field-effect transistor Tx. By choosing the ratios Iba/Ibb, W(T7)/W(T4) and W(T5)/W(T6) to be equal to each other, where the length of the channel of T7 equals the length of the channel of T4, and the length of the channel of T5 equals the length of the channel of T6, it is ensured that the voltage over transistor T3 is identical to the voltage over transistor T4, so that a perfect current mirroring is obtained.

The previous embodiments show the following advantages:

the maximum and minimum output voltages of the emitter-followers are not limited by the measuring circuit.

a very high accuracy is possible.

the cathode current Ic appears substantially undistorted in the measured current Im.

the measurement is not disturbed by the quiescent current Ib.

no high peak currents are supplied to the measuring output OUTM.

a very high output impedance is present at the measuring output OUTM.

Figure 3:
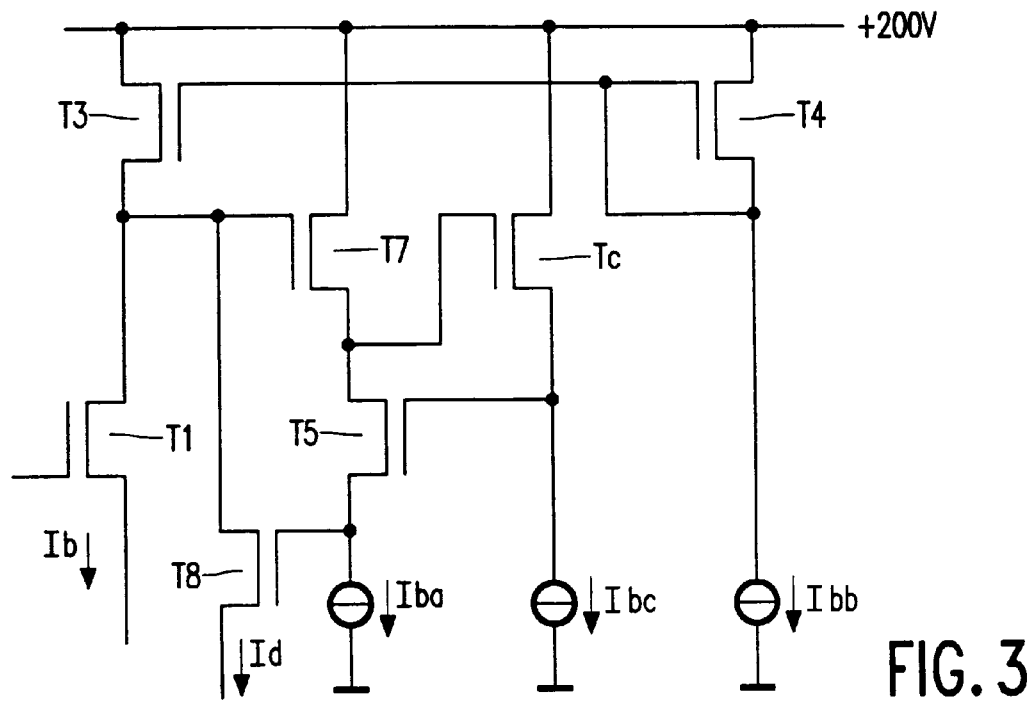
FIG. 3 shows part of a third embodiment of a beam current measuring device in accordance with the invention.

In a more refined embodiment as shown in FIG. 3, the cascoding of the transistor T7 with transistor T5 can also be made active. The accuracy of Ibias1 is only dependent on the voltage variation at the drain of transistor T5, and thus by the output impedance of transistor T5. By actively controlling the gate of transistor T5, it is possible to increase the output impedance of transistor T5. FIG. 3 differs from FIG. 2 in that transistor T6 is no longer present, in that the input of the current mirror T3, T4 is directly connected to the current source Ibb, and by providing an additional transistor Tc having a source connected to the 200 V supply line, a gate connected to the junction point of the drain of transistor T7 and the source of transistor T5, and a drain connected to a current source Ibc and the gate of transistor T5.

Figure 4:
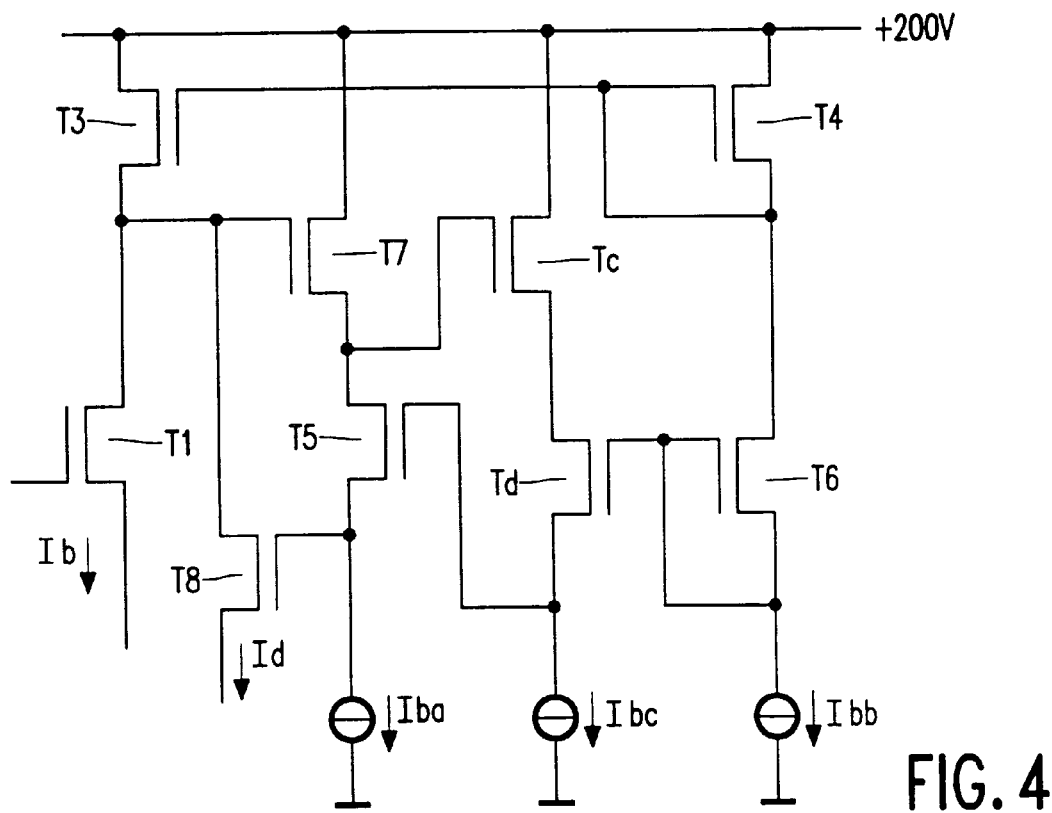
FIG. 4 shows part of a fourth embodiment of a beam current measuring device in accordance with the invention.

FIG. 4 shows an even better implementation, in which transistor T6 is reinserted between the input of the current mirror T3, T4 and the current source Ibb. A transistor Td is inserted, having a source connected to the drain of the transistor Tc, a gate connected to the gate and the drain of transistor T6, and a drain connected to the gate of transistor T5 and the current source Ibc. It will be evident that similar alterations can be effected, for example, by rendering Td active in a similar manner as T5 has been made active. This will result in increasingly smaller transistors and quiescent currents.

Figure 5:
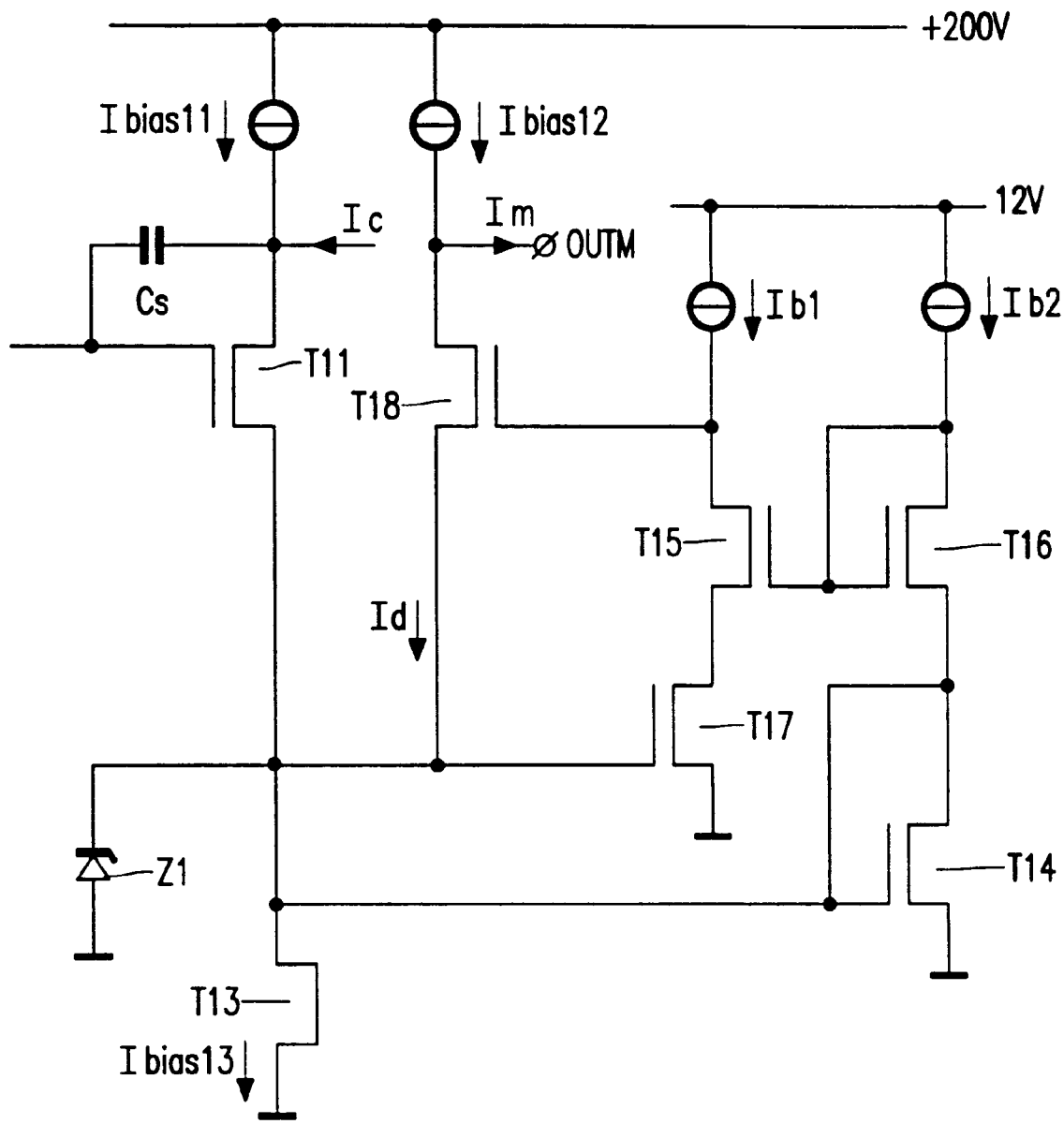
FIG. 5 shows part of a fifth embodiment of a beam current measuring device in accordance with the invention.

FIG. 5 shows part of a fifth embodiment of a beam current measuring device in accordance with the invention. The embodiment of FIG. 5 is an alternative to the embodiment of FIG. 2. A single "emitter-follower" transistor T11 has a source connected to the cathode of a picture display tube (not shown), a gate connected to an output amplifier stage (not shown), while a speed-up capacitor Cs is connected between the gate and the source of the transistor T11. The source of the transistor T11 is coupled to a 200 V supply line through a bias current source Ibias11. A drain of the transistor T11 is connected to an output of a current mirror T13, T14, and to ground through a zener diode Z1. The input of the current mirror T13, T14 is connected to the source of a transistor T16. A gate and drain of the transistor T16 are connected to a 12 V supply line through a current source Ib2. A source of a transistor T15 is connected to a drain of a transistor T17. A source of the transistor T17 is connected to ground. A gate of the transistor T17 is connected to the junction point of the zener diode Z1 and the output of the current mirror T13, T14. Transistor T15 is a cascode transistor for transistor T17 and transistor T16 supplies a bias current for transistor T15. A drain of the transistor T15 is connected to the 12 V supply line through a current source Ib1, and to a gate of a transistor T18. A source of the transistor T18 is connected to the junction point of the zener diode Z1 and the output of the current mirror T13, T14. A drain of the transistor T18 is connected to the measuring output OUTM and to the 200 V supply line through a current source Ibias12. A current Ibias13 through the output transistor T13 should be equal to the sum of the currents Ibias11 and Ibias12. The zener diode Z1 clamps the current Ibias13 during transients in which the cathode current exceeds the currents Ibias11 and Ibias12. Similar clamps are also added in the other embodiments.

It should be noted that the above-mentioned embodiments illustrate rather than limit the invention, and that those skilled in the art will be able to design many alternative embodiments without departing from the scope of the appended claims. While field-effect transistors are shown, bipolar transistors are also possible but field-effect transistors render a very high accuracy possible in view of the absence of gate currents.

What is claimed is:

1. A beam current measurement device, comprising:
    an output stage for supplying a cathode current;
    a measurement output for supplying a measured current representing the cathode current;
    means for supplying a first current, the first current supplying means being coupled to a first main terminal of the output stage;
    means for supplying a second current substantially equal to said first current, the second current supplying means being coupled to a second main terminal of the output stage; and
    a first cascode transistor coupled between the first main terminal of the output stage and the measurement output.

2. A beam current measurement device as claimed in claim 1, further comprising a second cascode transistor coupled between the second main terminal of the output stage and the measurement output.

3. A beam current measurement device as claimed in claim 1, wherein the first current supplying means comprises:
    a current mirror having an output coupled to said first main terminal of the output stage; and
    a cascode arrangement including a cascoded transistor for keeping a voltage at said first main terminal of the output stage constant, a cascode transistor having a first main terminal coupled to said cascoded transistor and a second main terminal coupled to a first auxiliary current source and to a control terminal of said first cascode transistor, and a control transistor having a first main terminal coupled to an input of said current mirror and a second main terminal coupled to a second auxiliary current source and to control terminals of said cascode transistor and said control transistor.

4. A beam current measurement device as claimed in claim 1, wherein the first current supplying means comprises:
    a current mirror having an output coupled to said first main terminal of the output stage;
    a first cascode arrangement including a primary cascoded transistor for keeping a voltage at said first main terminal of the output stage constant, and a primary cascode transistor having a first main terminal coupled to said cascoded transistor and a second main terminal coupled to a first auxiliary current source and to a control terminal of said first cascode transistor; and a second cascode arrangement including a secondary cascoded transistor for keeping a voltage at said first main terminal of the primary cascode transistor constant, and a secondary cascode transistor having a first main terminal coupled to said secondary cascoded transistor and a second main terminal coupled to a second auxiliary current source and to a control terminal of said primary cascode transistor, and a control transistor having a first main terminal coupled to an input of said current mirror and a second main terminal coupled to a third auxiliary current source and to control terminals of said secondary cascode transistor and said control transistor.

5. A picture display apparatus, comprising:

a picture display tube having a cathode to which a cathode current is applied; and a video signal output stage coupled to the cathode, the video output stage including a beam current measurement device for measuring the cathode current, said beam current measurement device, comprising:

an output stage for supplying a cathode current;

a measurement output for supplying a measured current representing the cathode current;

means for supplying a first current, the first current supplying means being coupled to a first main terminal of the output stage;

means for supplying a second current substantially equal to said first current, the second current supplying means being coupled to a second main terminal of the output stage; and a first cascode transistor coupled between the first main terminal of the output stage and the measurement output.

* * * * *